(12) United States Patent
Hearing et al.

(10) Patent No.: US 10,486,675 B2
(45) Date of Patent: Nov. 26, 2019

(54) VEHICLE BRAKE MONITORING THROUGH ULTRASONIC EMISSIONS

(71) Applicants: Brian Hearing, Falls Church, VA (US); Paul Terpstra, Janesville, WI (US)

(72) Inventors: Brian Hearing, Falls Church, VA (US); Paul Terpstra, Janesville, WI (US)

( * ) Notice: Subject to any disclaimer, the term of this patent is extended or adjusted under 35 U.S.C. 154(b) by 0 days.

(21) Appl. No.: 16/184,733

(22) Filed: Nov. 8, 2018

(65) Prior Publication Data
US 2019/0143952 A1    May 16, 2019

Related U.S. Application Data

(60) Provisional application No. 62/584,753, filed on Nov. 11, 2017.

(51) Int. Cl.
| | |
|---|---|
| *B60T 17/22* | (2006.01) |
| *F16D 66/00* | (2006.01) |
| *H04R 3/04* | (2006.01) |
| *G07C 5/08* | (2006.01) |
| *G07C 5/00* | (2006.01) |
| *F16D 66/02* | (2006.01) |

(52) U.S. Cl.
CPC ............ *B60T 17/221* (2013.01); *B60T 17/22* (2013.01); *F16D 66/00* (2013.01); *G07C 5/0816* (2013.01); *H04R 3/04* (2013.01); *F16D 66/028* (2013.01); *F16D 2066/006* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 4,334,428 | A | * | 6/1982 | Fima ..................... B60C 23/042 340/448 |
| 5,372,221 | A | | 12/1994 | Jalbert |
| 5,878,365 | A | * | 3/1999 | Onogi ..................... B60T 8/171 303/146 |
| 8,078,353 | B2 | | 12/2011 | Yow et al. |
| 8,152,246 | B2 | | 4/2012 | Miller et al. |
| 2002/0189726 | A1 | * | 12/2002 | Statnikov ................. B23K 9/32 148/558 |
| 2004/0187581 | A1 | * | 9/2004 | Kamiya .................. G01N 29/12 73/593 |
| 2004/0243358 | A1 | | 12/2004 | Schliep et al. |
| 2010/0116523 | A1 | * | 5/2010 | Nachbauer .......... B60R 16/0207 174/113 R |

(Continued)

*Primary Examiner* — Curtis J King (57) ABSTRACT

A system, method, and apparatus for vehicle brake monitoring are disclosed. An example method includes receiving a vehicle brake sound signal in a microphone and recording, via a sound card, a digital sound sample of the sound signal, the digital sound sample having a predetermined duration. The method also includes processing, via a processor, the digital sound sample into a feature frequency spectrum. The method further includes applying, via the processor, broad spectrum matching to compare the feature frequency spectrum at least one spectrum recorded previously and stored in a database. The method moreover includes, conditioned on significant changes from that previously recorded spectrum, transmitting via the processor, an alert that problems may exist with the sampled vehicle brake.

9 Claims, 5 Drawing Sheets

(56) References Cited

U.S. PATENT DOCUMENTS

| | | | | |
|---|---|---|---|---|
| 2015/0081170 A1* | 3/2015 | Kikuchi | ............... | B60G 17/018 |
| | | | | 701/37 |
| 2018/0106319 A1* | 4/2018 | Solari | ..................... | B60T 17/22 |
| 2018/0312147 A1* | 11/2018 | Murayama | ............ | B60T 13/662 |
| 2019/0093722 A1* | 3/2019 | Patel | .................. | F16D 65/0006 |

* cited by examiner

VEHICLE BRAKE MONITORING THROUGH ULTRASONIC EMISSIONS

This application is a continuation-in-part of provisional application Ser. No. 62/584,753 that was filed on Nov. 11, 2017 the disclosure of which is hereby incorporated by reference.

FIELD OF THE INVENTION

The invention relates to the process of monitoring emitted ultrasonic sounds from vehicle brakes to evaluate the condition of the vehicle's brakes.

BACKGROUND OF THE INVENTION

Despite advances in vehicle safety technology vehicle brakes remain a common cause of accidents and mechanical breakdowns. Fatal tractor trailer accidents cost Americans more than $20 billion every year and one person is killed or injured in a truck accident every 16 minutes. According to a recent study by the United States Department of Transportation (DOT) almost 30% of all commercial truck accidents involve brake failure and roadside inspections fail on average 15% of all trucks and buses inspected due to brake-related violations. Mechanical breakdowns cost additional time and money in unplanned repairs and vehicle downtime.

There are many potential problems with brakes in addition to normal brake component wear. Uneven wear, warping, and polishing of components can occur due to mismatched components, debris between fiction surfaces, and misalignments during installation. Friction surface cracks, breakage, and delamination can occur suddenly without warning. Overheating and heat checking can be caused by overloaded vehicles and excessive and sudden braking. Contamination and corrosion of braking components can occur due to fluid leaks or road surface treatment chemicals. Braking imbalances can be caused by air system valve problems and occur in many locations such as tractor versus trailer, axle versus wheel-end, and driver versus passenger sides.

Current maintenance procedures call for periodic scheduled inspections but vehicle brakes are inherently difficult to fully inspect since many critical components face each other (usually with only millimeter-sized gaps) and are not visible without invasive and costly manual inspection. Because of this, vehicle brakes are usually not disassembled and fully inspected more than twice a year and many problems can occur without notice between inspections. Additional evaluation methods are available such as performance-based brake testers (PBBT, including roller-dynamometers) and telematics but they too are often costly in terms of both time and money. Thus, the need exists for a low-cost, high-speed capability to monitor the condition of vehicle brakes and alert operators when problems are detected.

A number of prior patents have considered the use of acoustic information to analyze one or more aspects of brakes. For example, U.S. Pat. No. 5,372,221 uses active ultrasonic sources to measure brake pad thickness like the use of ultrasonic sounds in fetal examinations of human pregnancies. The system does not sense ultrasonic emissions from the brakes in operation. See also US Patent Publication No. 2004/0243358 and U.S. Pat. No. 9,482,301.

U.S. Pat. No. 8,078,353 measures road noise to predict driving conditions.

U.S. Pat. No. 8,152,246 discusses using microphones mounted on the vehicle to detect acoustic signatures of brakes with broken drive tendons, which will sound different than brakes that are working effectively. With a microphone on the vehicle, however, the system will have to account for environmental and road noises and need a separate device for each vehicle.

SUMMARY OF THE INVENTION

The present disclosure provides a new and innovative system, method, and apparatus for monitoring vehicle brakes through ultrasonic emission analysis. The system, method, and apparatus use broad spectrum matching to evaluate vehicle brake conditions. The use of broad spectrum matching enables an entire frequency spectrum of tones emitted by a vehicle to be compare to historical records for accurate and precise vehicle brake evaluation.

In an example embodiment, a vehicle brake monitoring device receives a vehicle brake sound signal in a microphone. A sound card within the device records a sound sample of the sound signal. A processor within the device processes the recorded sound sample into a feature frequency spectrum. The processor uses broad spectrum matching to compare the feature frequency spectrum to at least one spectrum recorded previously and stored in a database. The at least one vehicle brake sound record corresponds to a previous braking event from that vehicle. The processor also transmits an alert conditioned on significant deviations from that previously recorded spectrum, which may indicate problems with the vehicle brakes.

Additional features and advantages of the disclosed system, method, and apparatus are described in, and will be apparent from, the following Detailed Description and the Figures.

DETAILED DESCRIPTION OF THE INVENTION

Figure 4:
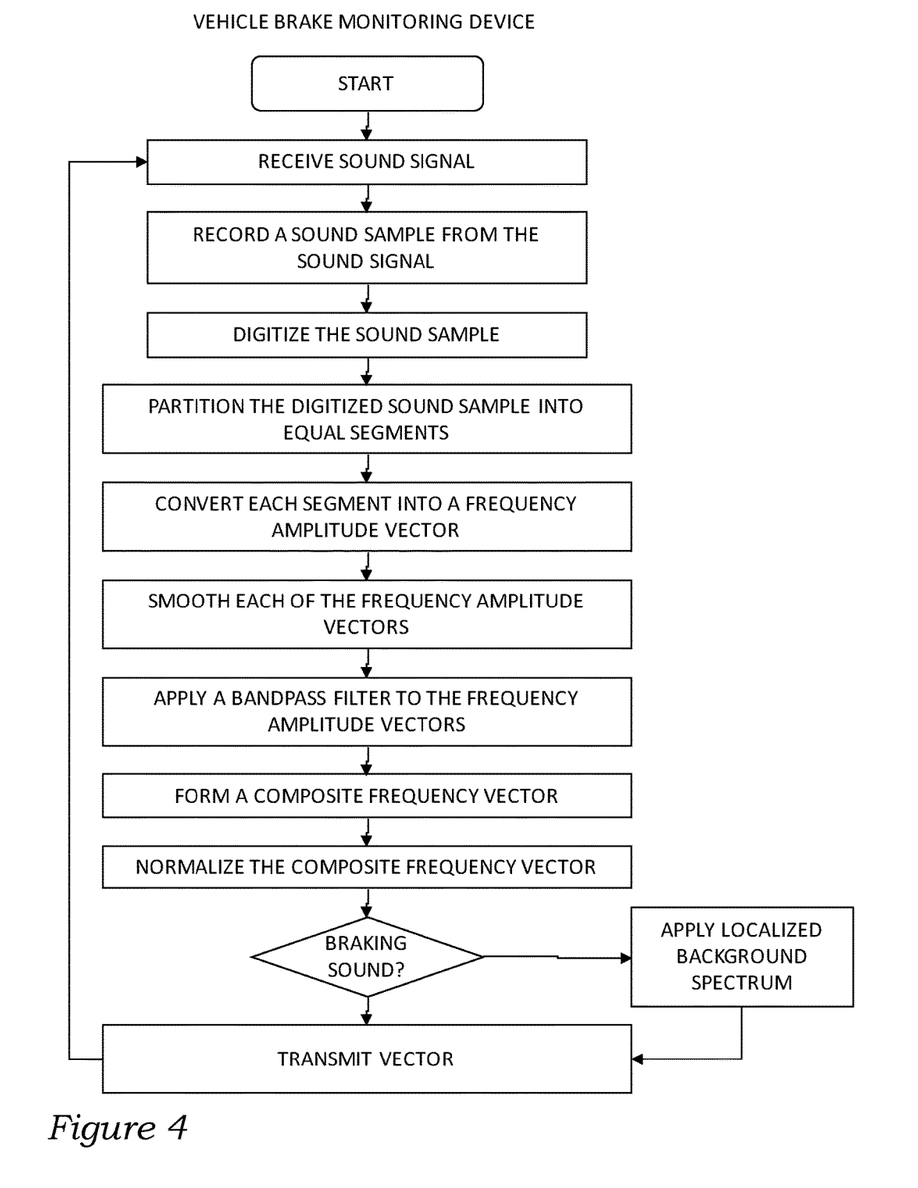
FIG. 4 illustrates a flow diagram showing an example procedure to monitor and evaluate vehicle brakes, according to an example embodiment of the present disclosure.

Vehicle brakes emit acoustic energy as a result of the friction conversion of the vehicle's kinetic energy to thermal energy where a small fraction of that energy finds its way to vibrational energy. Profiles of actual contact surfaces are microscopic in size and have been shown to emit acoustic energy into the ultrasonic realm. Manufacturers measure acoustic emissions of braking systems during the design phase via noise, vibration, and harshness (NVH) analyses where parameters such as pad thickness and structural integrity have been shown to affect acoustic emissions (FIG. 4). However, these acoustic analysis systems have traditionally involved high-cost technologies suitable for laboratory environments only.

Recent developments in low-cost, high-speed processing, weather-proof microphones, and pervasive networking now enable the ability to monitor and use acoustic and ultrasonic vehicle brake emissions to evaluate the condition and health of the braking system during its service life. The present disclosure describes acoustic and ultrasonic sensors that are installed in locations where vehicles brake regularly over their service life (garages, depots, maintenance yards, etc.). Vehicle brake ultrasonic emissions are analyzed and compared to previous measurements to compute evaluation criteria such as sudden changes to the spectra, patterns indicating wear conditions, and relative amplitude and spectra from different wheels that might indicate imbalances. These measures can be used to alert owners and operators to potentially dangerous braking conditions such as friction surface breakages, overheating, contamination, uneven wear, and unbalanced breaking.

Measurements taken with the present disclosure show how emissions can be used to alert to potentially dangerous braking conditions. Spectra of both drum and disc brakes remain relatively unchanged on the same vehicle despite different operators and different weather conditions. The spectra indicating uneven wear of friction surfaces were all at frequencies above adult human thresholds.

Testing shows that average changes in spectra among brakes on the same vehicle vary by less than 2% of the mean under different conditions. From this, sudden and significant changes to these spectra may indicate mechanical problems worth immediate inspection. The sound spectra amplitudes can be used to identify vehicles that may need servicing in both drum and disc brakes. Differences in amplitudes of different brakes on the same vehicle may be used to identify braking imbalances such as tractor versus trailer, front versus rear, and driver versus passenger sides.

Figure 1:
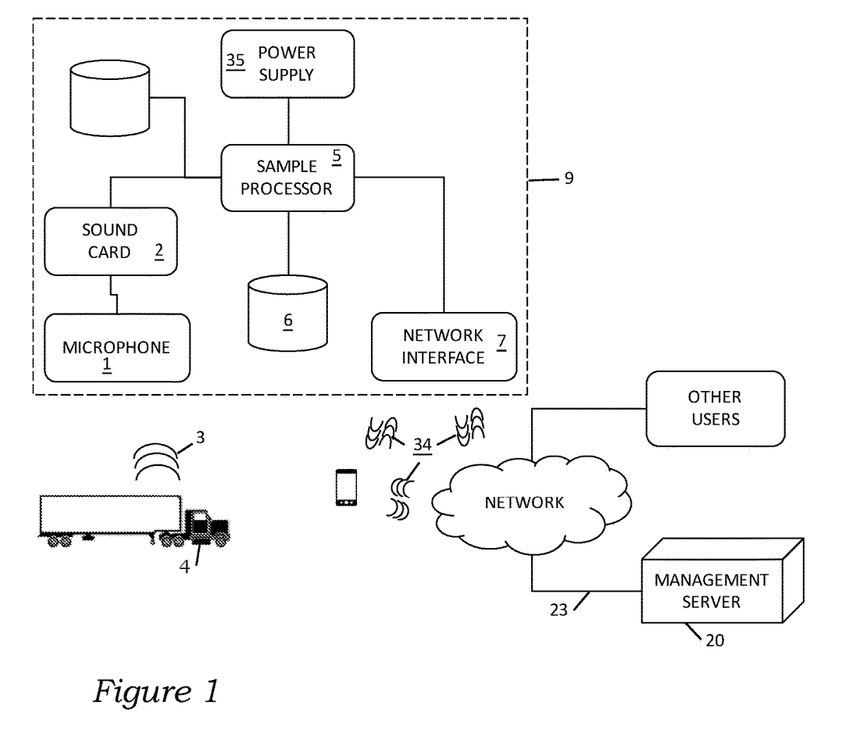
FIG. 1 shows an example vehicle brake monitoring environment including a sample processor and a management server, according to an example embodiment of the present disclosure.

The example vehicle brake monitoring device of FIG. 1 and according to the invention is configured to sense, analyze, and evaluate vehicle brakes. The example vehicle brake monitoring device is also configured to transmit an alert conditioned upon evaluating unsafe braking conditions in the vehicle. The vehicle brake monitoring device may include a self-contained apparatus that may be positioned at any location on a user's property including within a vehicle maintenance facility, vehicle storage lot, or centralized transportation facility. The vehicle brake monitoring device may include an exterior casing that is constructed from metal, hard plastic, soft plastic, and/or a combination thereof. In some instances, the vehicle brake monitoring device may be water-tight to enable deployment out-doors.

Microphone and Sound Card:

A preferred vehicle brake monitoring system according to the invention includes a microphone 1 and a sound card 2 to sense and digitize sound signals 3 from an examined vehicle 4. The microphone may include, for example, a hands-free clip-on mini lapel microphone. In other embodiments, the microphone may be configured to have a sensitivity within a frequency band associated with brake tones (e.g. 10,000 hertz to 50,000 hertz). The microphone may also be configured to have an acoustic sensitivity to evaluate brakes within 50 feet, 100 feet, 500 feet, etc. based on preferences of a manufacturer and/or user.

In some embodiments, the vehicle brake monitoring device may include more than one microphone. In some instances, the microphones may both be positioned with the same housing but facing different directions so as to increase the detection range of the device. Additionally, the vehicle brake monitoring device may include multiple microphones configured to be sensitive to different frequency bands. Such a configuration enables the vehicle brake monitoring device to be especially precise for vehicles that emit a tone that standard microphones may have difficulty sensing.

The example sound card 2 is configured to record and digitize a sound signal sensed by the microphone 1. The sound card may include a USB external sound card, for example. Other sound cards may also be used that are specifically configured for processing sound signals with frequencies common among vehicle brakes.

Figure 2:
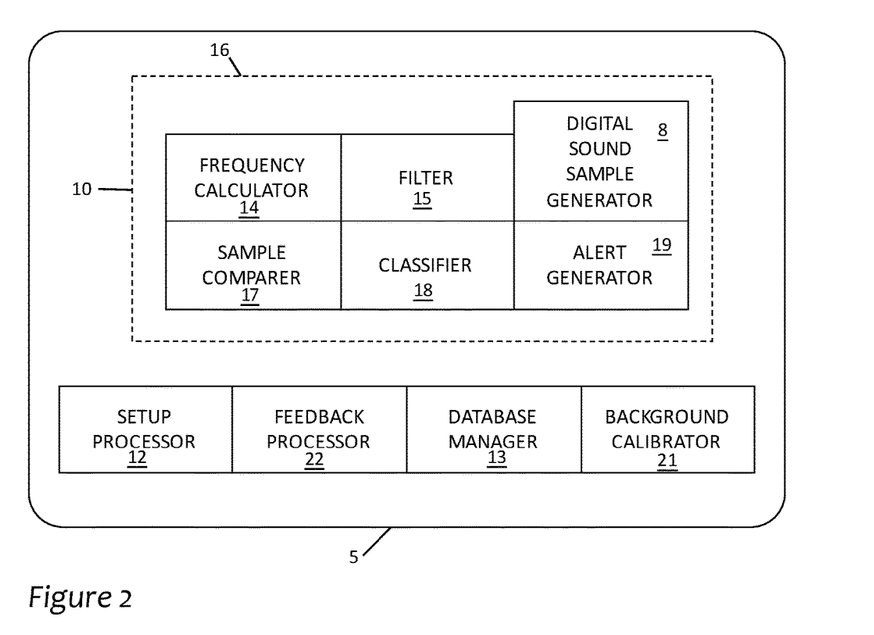
FIG. 2 shows a diagram of the sample processor of FIG. 1, according to an example embodiment of the present disclosure.

Sample Processor and Database:

The preferred vehicle brake monitoring system according to the invention also includes a sample processor 5, such as that shown in more detail in FIG. 2, in a programmed general purpose computer that is configured to convert a digitized sound sample into a feature frequency spectrum and compare the feature frequency spectrum to at least one spectrum recorded previously and stored in the database 6. As a result of this comparison, a display or other output associated with the computer, such as a network interface 7, displays information from the database 6 that the operator uses to evaluate the status of the brakes associated with the examined vehicle 4.

The sample processor 5 may operate on a Linux operating system and use Python and PHP scripting and programming languages. In other embodiments, the sample processor may operate using other types of operating systems and/or processing languages. FIG. 2 discloses further detail and features of the sample processor.

The vehicle brake monitoring system also includes a database 6 that is configured to store previous vehicle brake sounds spectra and a parameter database configured to store the parameters for spectrum evaluation and/or classification. The databases may comprise any type of computer-readable medium, including RAM, ROM, flash memory, magnetic or optical disks, optical memory, or other storage medium. In addition to the databases, the vehicle brake monitoring device may also include a memory to store instructions for processing digital signals into a feature frequency spectrum, comparing feature frequency spectrums to previous vehicle brake sound spectra, determining whether to transmit an alert, etc. The vehicle brake monitoring devices may also include a memory to store previous brake alerts and/or evaluations.

The sample processor 5 includes components for evaluating vehicle brake condition and transmitting alerts. In addition, the sample processor 5 includes components that handle provision, feedback, and database management. It should be appreciated that each of the components may be embodied within machine-readable instructions stored in a memory that are accessible by a processor (e.g. the sample processor 5). In other embodiments, some or all of the components may be implemented in hardware, such as an application specific integrated circuit ("ASIC"). Further, the sample processor 5 may include fewer components, or some of the discussed components may be combined or rearranged.

As discussed in more detail below, the sample processor 5 includes a digital sound sample generator 8 that is configured to convert digital signals into a frequency spectrum. This includes digital sound samples sensed from examined vehicle 4 within proximity of the vehicle brake monitoring device 9 and brake sound samples stored as audio files within the database server 6. Components 10 are configured to convert digital sound samples 11 into a feature frequency spectrum and convert the sound samples into sound signatures (e.g. a frequency spectrum of the brake sound samples). Components also use broad spectrum matching to compare the feature frequency spectrum to the brake sound database to accordingly detect dangerous brake conditions.

The sample processor 5 includes a setup processor 12 to evaluate and store vehicle brake acoustic emissions. The setup processor 12 is configured to prompt or otherwise receive user and/or manufacturer parameters and apply those parameters for the evaluation and alerting of brake condition. The setup processor 12 may, for example, provide a user interface or web form that enables a user to specify parameters. Alternatively, a user may use the application to enter parameters, which are transmitted to the setup processor 12 for configuration.

The sample processor 12 is configured to use a database manager 13 to access the brake sound database 6 for brake sound samples and/or brake sound signatures. Brake sound samples are acoustic samples of vehicles braking under a variety of conditions (i.e. different background environments). The acoustic samples may be stored as a WAV file, an AC-3 file, and AAC file, an MP3 file, or any other audio file. Each recording is labeled or otherwise associated with make, model, class, brand, etc. of the braking system that generated the acoustic sample. In some instances, the make, model, class, etc. may be stored as metadata of the audio file.

The sample processor 5 includes a frequency calculator 14 to convert a digital sound sample or a braking sound sample into one or more frequency amplitude vectors. The sound card may have digitized the digital sound sample from a sound signal 3 sensed by the microphone 1 using, for example, a sample rate of 384,000 samples per second with a 16-bit quantization per sample.

The sample processor 5 includes a filter 15 configured to remove noise from each of the frequency amplitude vectors for the respective segments. The filter 15 may use, for example, a sliding median filter to smooth each of the frequency amplitude vectors. The filter 15 may also use a bandpass filter to remove noise. The bandpass filter may be configured to pass, for example, the 10 kHz to 50 kHz frequencies of the frequency amplitude vectors to remove noise and other unwanted acoustic artifacts. The bandpass filter may use, for example, approximately 4,000 bins for the filtering. It should be appreciated that the bandpass filter may be adjusted based on tones generated by brakes.

The sample processor 5 includes a composite vector processor 16 associated with frequency calculator 14 that is configured to combine each of the segments into a single frequency vector. For example, the composite vector processor is configured to combine the segments by determining an average of all the filtered frequency amplitude vectors (associated with the same digital sound sample or same portion of the digital sound sample) corresponding to the segments and generating a composite frequency amplitude vector based on the determined average. In some embodiments, the composite vector processor may weigh each of the filtered frequency amplitude vectors differently based on, for example, an amount of noise removed, an order within a sequence, etc.

The sample processor 5 includes a sample comparer 17 to determine a difference between each brake sound signature and the feature frequency spectrum using broad spectrum matching. To determine a distance between the feature frequency spectrum and the braking sound signature, the sample comparer is configured to determine a linear distance between the feature frequency spectrum and the brake sound signature for each frequency (or frequency band), thereby making a comparison over the entire frequency spectrum under analysis (e.g. broad-spectrum matching). The sample comparer 17 is also configured to integrate (or otherwise sum) the determined linear distances over the entire frequency spectrum to calculate a single distance value. In other words, the sample comparer 17 determines the difference in total area between a feature frequency spectrum and each brake sound signature. The sample comparer may determine this difference in area using, for example, a Wasserstein metric, and earth-mover's distance algorithm, a Euclidean distance algorithm, etc.

The sample processor 17 includes a classifier 18 to identify dangerous braking conditions. For each feature frequency spectrum (e.g. each digital sound sample), the sample classifier 18 is configured to determine a lowest distance or area value (e.g. the Wasserstein metric) corresponding to the plurality of brake sound signatures. The classifier determines if the difference between the feature frequency spectrum and the plurality of brake sound signatures is significant enough to indicate possibly dangerous braking conditions.

False classifications could be produced by unusual background noises that are present during the digital sound sample (e.g. insects, additional road noise, weather, etc.). To reduce false classifications, the classifier 18 is configured via an adjustable distance measure, for example, based on a user providing a value and/or the specified number may be set by a manufacturer. It should be appreciated that the classifier 18 may use any algorithm to make the classification including, for example, a k-NN algorithm.

Due to variables in brake noise generation from factors such as different drivers, different background environments, and different weather conditions, the braking sound sample can vary significantly. The processor 5 determines which braking sound segments to use in the comparer 18 by evaluating acoustic sample data in addition to the spectra such as total amplitude and duration of the sample. If those measures are not close enough to the composite signatures than the feature spectrum may not be a good candidate for evaluation.

The sample processor 5 includes an alert generator 19 that creates and transmits alerts responsive to the classifier classifying a braking sound sample as indicative of possible dangerous braking conditions. The alert generator 19 creates an alert based on preferences by the user and creates a message specific for the protocol specified by a user. The alert generator 19 may also queue detections and corresponding detection information for transmission to the management server 20. Moreover, the alert generator 19 is configured to store to a data structure each detection incident.

The sample processor 5 includes a background calibrator 21 to adjust braking sound samples and/or digital sound samples based on environmental characteristics specific to the evaluation environment. For instance, each property and/or building has unique features that affect acoustic signals or tones generated by brakes. Some building features, landscaping, or microphone location may cause certain frequencies to be attenuated, amplified, shifted, etc. Such change in frequencies may reduce the accuracy of evaluations.

A common challenge for vehicle brake acoustic evaluation is that vehicles oftentimes operate in environments with different amounts and types of background noise. For example, a vehicle brake monitoring device operating near heavy traffic is subject to certain background noises from heavy traffic. The exemplified sample processor 5 may create static background sound signatures periodically and/or updated based on extended use of the vehicle brake monitoring device 9. The exemplified vehicle brake monitoring device 9 is configured to consider background noise in a sound signal by comparing the background sound signatures and the vehicle brake sound signatures in the database to a received sound signal. The vehicle brake monitoring device 9 determines a combination or one or more sound signatures the best approximate a received sound signal. The vehicle brake monitoring device 9 then determines if significant background noise is included in the combination to determine the effectiveness of the brake condition evaluation. If too much background noise is detected, the sample may not be a good candidate to evaluate the condition of the vehicle brake.

The sample processor 5 includes a feedback processor 22 to refine evaluations based on false-positive evaluations and false-negatives. For example, after the alert generator 19 transmits an alert, a user may provide feedback that there are in fact no dangerous braking conditions. The user may provide the feedback via, for example the user interface. Responsive to receiving the feedback, the feedback processor 22 is configured to adjust the distance thresholds used in issuing alerts in future vehicle brake evaluations.

Figure 3:
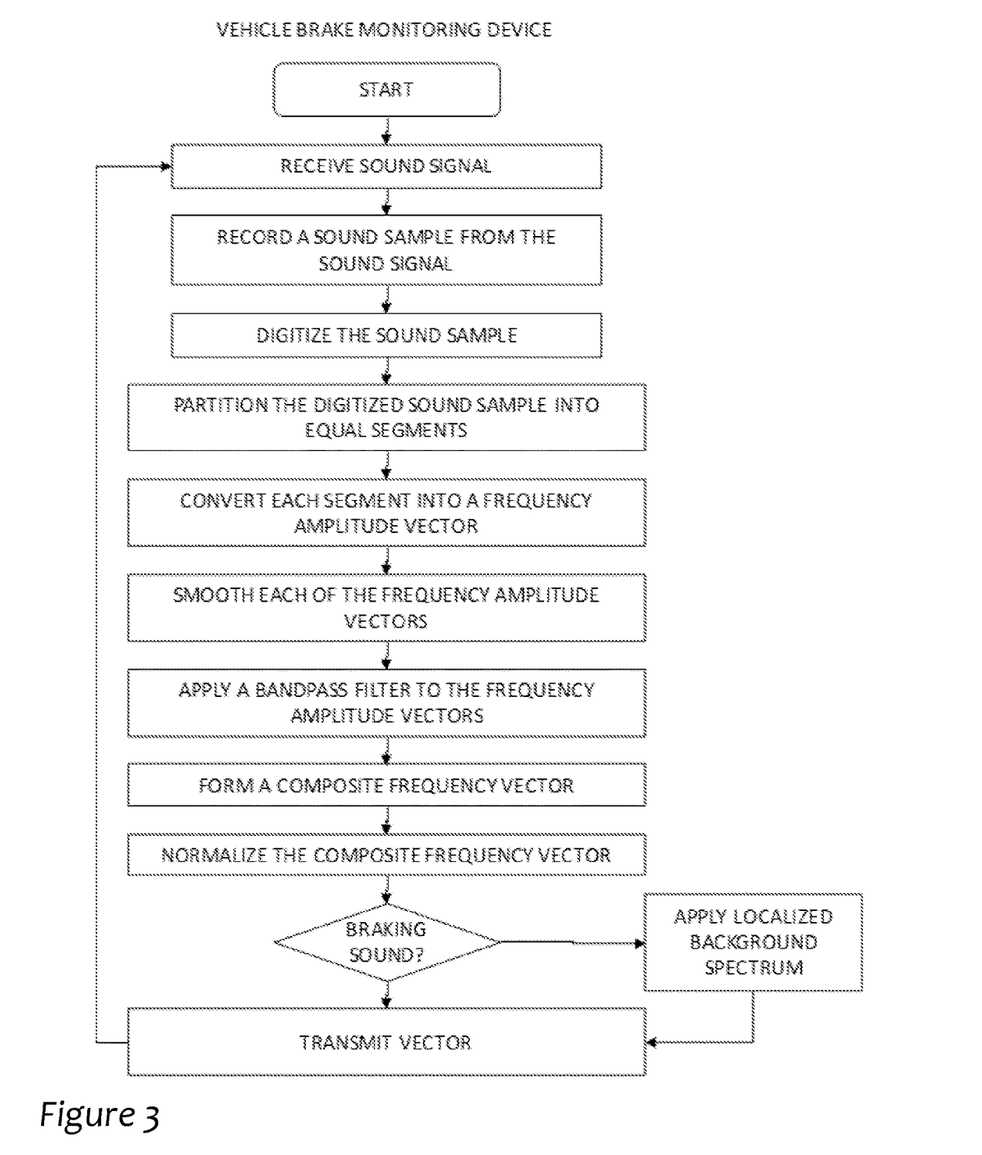
FIG. 3 illustrates a flow diagram showing an example procedure to create a feature frequency spectrum and/or vehicle brake sound signature, according to an example embodiment of the present disclosure.

FIG. 3 is a flow chart showing an exemplary procedure to establish baseline vehicle brake sound signatures and/or feature frequency spectrums, according to an embodiment of the present disclosure. Although the procedure is described with reference to the flow diagram, it should be appreciated that many other methods of performing the steps associated with the procedure may be used. For example, the order of many of the blocks may be changed, certain blocks may be combined with other blocks, and many of the blocks described are optional. Further, the actions described in the procedure may be performed among multiple devices including, for example the frequency processor, the filter, the composite vector processor (collectively the sample processor), the microphone, and/or the sound card.

FIG. 4 is a flowchart showing the determination points and questions for analyzing an ultrasonic wave spectrum from the brakes of a new vehicle.

As noted above, the preferred system according to the present invention is configured to enable a user to provision, calibrate, record vehicle brake sound samples, receive alerts, and communicate with the vehicle brake monitoring devices. In addition, the system may include features that use alert information to provide a more comprehensive alert. For example, the system may receive an indication of an alert including a location of the vehicle brake monitoring device that makes the alert and/or a detailed description of the vehicle and of a possible dangerous braking condition.

The management server 20 is configured to manage the distribution of vehicle brake monitoring devices and braking sound samples. As previously discussed, the management server 20 is configured to receive braking sound samples 23 from any device making a recording of a braking event. The management server 20 is also configured to compile braking event evaluations and make these evaluations available to owners in report form. In some instances, different users provide different types of geographic information, which is resolved by the management server 20 into the appropriate location of vehicles housed in that particular location. The management server 20 and/or the application may enable a user to filter the data for specific locations, time periods, vehicle class, vehicle brand, etc.

Figure 5:
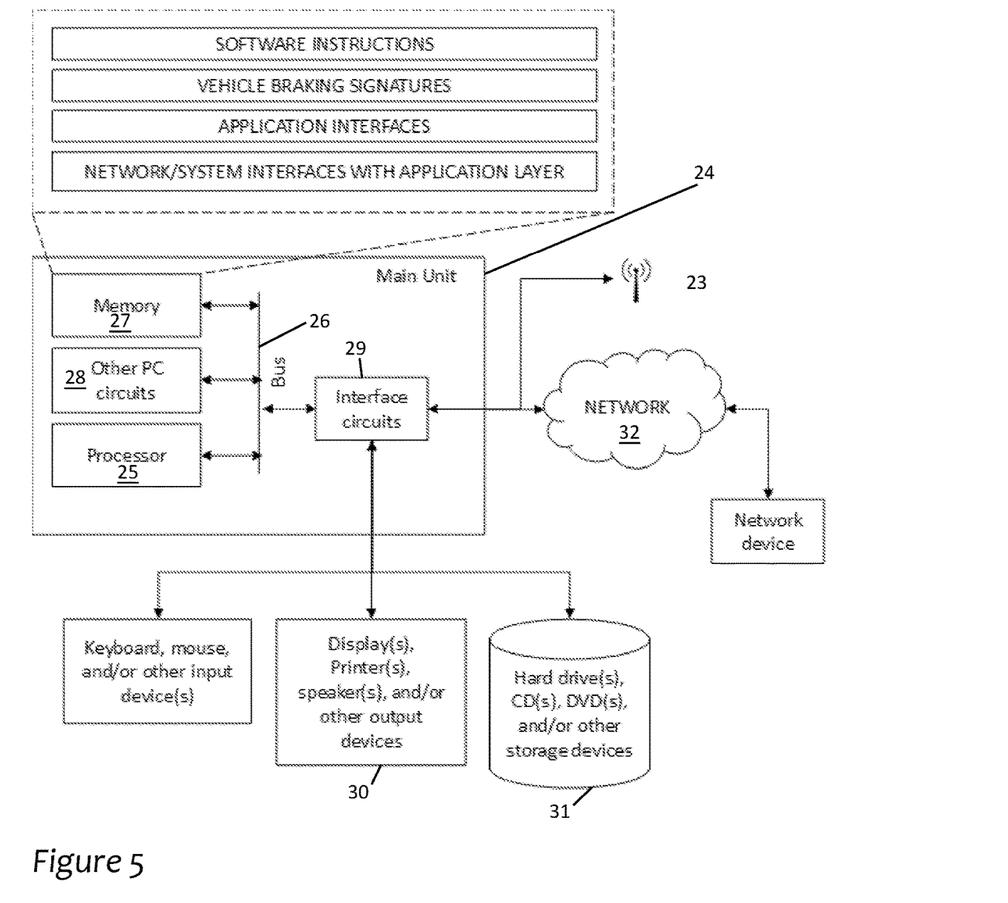
FIG. 5 shows a detailed block diagram of an example of a sample processor, user device and/or management server, according to an example embodiment of the present disclosure.

In this processor, illustrated in FIG. 5, the device includes a main unit 24 which preferably includes one or more processors 25 communicatively coupled by an address/data bus 26 to one or more memory devices 27, other computer circuitry 28, and one or more interface circuits 29. The exemplified memory devices store software instructions, vehicle braking sound signatures, user interface features, permissions, protocols, etc. The interface circuit may be implemented using any suitable interface standard, such as an Ethernet interface and/or a Universal Serial Bus ("USB") interface. One or more displays, printers, speakers, and/or other output devices 30 may also be connected to the main unit via the interface circuit 29. One or more storage devices 31 may also be connected to the main unit via the interface circuit 29. The computing device may also exchange data with other network devices via a connection to a network (e.g. the Internet) 32 or a wireless transceiver 33 connected to the network 32. Access to the devices can be controlled by appropriate security software or security measures.

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

Reports and Alerts:

The example sample processor 5 is configured to transmit different types of reports and alerts based on, for example, preference of a user, manufacturer, etc. Depending on the type of report or alert, the sample processor may create a message that includes a time of evaluation, a determined brake condition, and/or an identifier of the vehicle. The sample processor formats the message based on the type of alert specified by the user. For example, the sample processor may configure a message for Simple Mail Transfer Protocol ("SMTP"), Short Message Service ("SMS"), File Transfer Protocol ("FTP"), Hyper Text Transfer Protocol ("HTTP"), Secure Shell Transport Layer Protocol ("SSH"), etc. After formatting the appropriate message, the example sample processor transmits the message.

In some embodiments, the sample processor 5 may be configured to queue reports until specified times. In these embodiments, the sample processor 5 transmits the reports at the specified time. Additionally, or alternatively, the sample processor 5 may be configured to provide different contexts of evaluations and/or classifications. For example, text messages may be transmitted to the user device as soon as possible after detection of dangerous braking conditions. However, FTP-based reports are transmitted to the management server every few days, weeks, etc. In this example, the text message may include specific vehicles where the dangerous conditions were detected. In contrast, the FTP-based message may include longer term trends, predictions about future conditions, and nature of changes detected.

Network and Interface:

As mentioned, the sample processor 5 is configured to receive user input and transmit alerts and other data associated with alerts. The vehicle brake monitoring device 9 includes a network interface 7 that facilitates communication between the sample processor 5 and devices external to the device. The network interface 7 may include a wired and/or wireless interface to connect to, for example, the network and/or the user device. For instance, the network interface 7 may include an Ethernet interface to enable the vehicle brake monitoring device 9 to connect to a router and/or network gateway. The network interface 7 may also include a WLAN interface to enable the vehicle brake monitoring device to communicatively couple to a wireless router and/or a wireless gateway. The network interface 7 may further include a cellular interface to enable the vehicle brake monitoring device to communicatively couple to a 4G LTE cellular network 34, for example. The network interface may also include functionality to enable powerline communications. The network interface 7 may moreover include a Bluetooth interface (and/or a USB interface, a Near Field Communication ("NFC") interface, etc.) to enable, for example, the user device to communicate directly with the vehicle brake monitoring system without the use of the network.

Power Supply:

The example vehicle brake monitoring system also includes a power supply 35 to provide power to, for example, the microphone 1, the sound card 2, the sample processor 5, the database server 6, and/or the network interface 7. The power supply may include a battery, and more specifically, a lithium ion battery. The power supply 35 may also include a voltage transformer to convert an AC signal from, for example, a wall outlet, into a regulated DC voltage. In some embodiments, the power supply 35 may include both a transformer and a battery, which is used when power from the wall outlet is not available. In further embodiments, the power supply 35 may include one or more solar panels, thereby enabling the vehicle brake monitoring device to operate in remote locations.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A process for remotely evaluating brake systems on a vehicle, said process comprising:
    (a) receiving from a vehicle brake during operation from one or more ultrasonic sound signals, wherein said one or more ultrasonic signals are located from the vehicle brake at a distance from said vehicle;
    (b) recording a digital sound sample of a predetermined duration from the one or more ultrasonic sound signals received;
    (c) converting the digital sound sample into a feature frequency spectrum;
    (d) comparing the feature frequency spectrum with one or more spectrum recordings in a database of spectrum recordings from vehicle brakes with one or more associated defects or problems;
    (e) transmitting to an operator an alert of any problems that may exist with the sampled vehicle brake.

2. The process according to claim 1 wherein said one or more ultrasonic signals are received by a stationary sensor that is not attached to said vehicle.

3. The process according to claim 1 wherein one of the one or more spectrum recordings in said database corresponds to ultrasonic sounds from said vehicle at a previous time when all of the brakes on said vehicle were known to be good and defect-free.

4. The process according to claim 1 wherein the transmitting comprises sending an alert to said operator if there exists a deviation from the previously recorded spectrum for said vehicle and which may indicate problems with at least one of the brakes of said vehicle.

5. The process according to claim 2 wherein said one or more ultrasonic sensors are located in a location where vehicles brake regularly over their service life.

6. The process according to claim 5 wherein said one or more ultrasonic sensors are located in a garage.

7. The process according to claim 5 wherein said one or more ultrasonic sensors are located in a maintenance yard.

8. The process according to claim 1 wherein said alert is based on a measured feature frequency spectrum that represents a pattern indicating wear.

9. The process according to claim 1 wherein said alert is based on a measured feature frequency spectrum that represents a pattern indicating differences in relative amplitude and spectra from different wheels that indicate an imbalance.

* * * * *